March 6, 1962 G. A. SCHAUER, JR 3,023,743
ENGINE CONSTRUCTION
Filed Nov. 12, 1957 6 Sheets-Sheet 1

Inventor
George A. Schauer, Jr.
By
McCanna, Morsbach & Pillote
Atty's

March 6, 1962 G. A. SCHAUER, JR 3,023,743
ENGINE CONSTRUCTION
Filed Nov. 12, 1957 6 Sheets-Sheet 4

Inventor
George A. Schauer, Jr.
By McCanna, Morsbach & Pillote
Atty's

March 6, 1962 G. A. SCHAUER, JR 3,023,743
ENGINE CONSTRUCTION
Filed Nov. 12, 1957 6 Sheets-Sheet 5

Inventor
George A. Schauer, Jr.
By McCanna, Morsbach & Pillote
Atty's

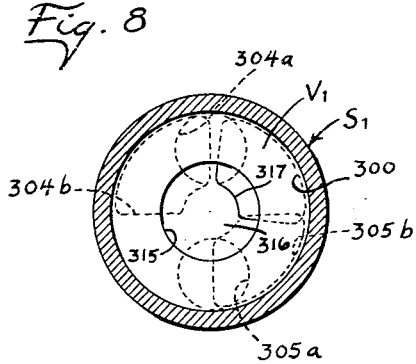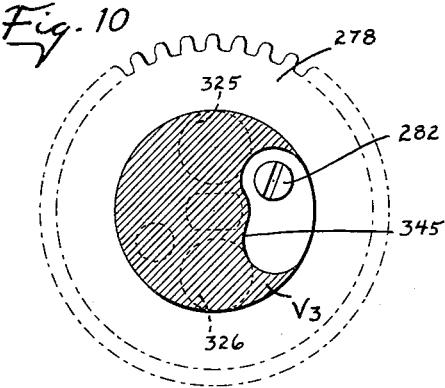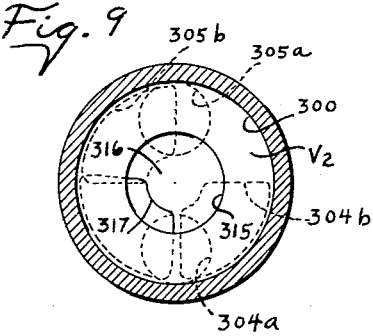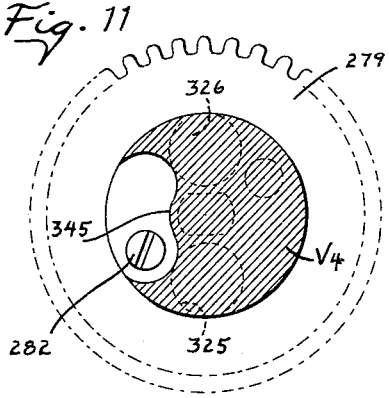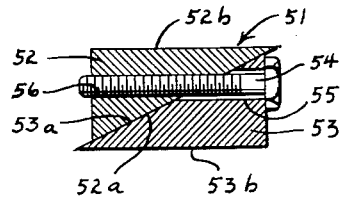

# United States Patent Office 3,023,743
Patented Mar. 6, 1962

3,023,743
ENGINE CONSTRUCTION
George A. Schauer, Jr., 507 N. State St., Belvidere, Ill.
Filed Nov. 12, 1957, Ser. No. 695,935
15 Claims. (Cl. 123—51)

This invention relates to novel useful improvements in engines and particularly to an improved opposed piston engine.

An important object of this invention is to provide an engine construction which is compact and light in weight.

Another object of this invention is to provide an engine construction which may be easily and economically constructed, and which may be readily assembled and disassembled for repair.

Another object of this invention is to provide an opposed piston engine in which the cylinder can be assembled or removed without necessitating disassembly of the engine crank shafts.

Still another object of this invention is to provide an improved engine construction in which the cylinder is formed separate from the engine frame and is supported thereon in such a manner as to enable free expansion and contraction of the cylinder relative to the frame.

Yet another object of this invention is to provide an improved multi-section cylinder construction for an opposed piston engine, which cylinder construction facilitates machining of the parts and which enables use of different materials in different portions of the cylinder to obtain the desired wear and corrosion resistant characteristics.

A further object of this invention is to provide an opposed piston engine having a crank case induction type fuel injection system and an improved crank shaft valving arrangement for controlling the flow of fuel into the crank cases and for also controlling the flow of fuel from one crank case to the other crank case.

These, together with various ancillary objects and advantages of this invention will be more readily appreciated as the same becomes better understood by reference to the following detailed description when taken in connection with the accompanying drawings wherein:

FIG. 8 is a fragmentary sectional view taken on the plane 8—8 of FIG. 6;

FIG. 9 is a fragmentary sectional view taken on the plane 9—9 of FIG. 6;

FIG. 10 is a fragmentary sectional view taken on the plane 10—10 of FIG. 6;

FIG. 11 is a fragmentary sectional view taken on the plane 11—11 of FIG. 6; and

FIG. 12 is a sectional view through one of the cylinder clamping blocks, illustrating details of construction.

Figure 1:
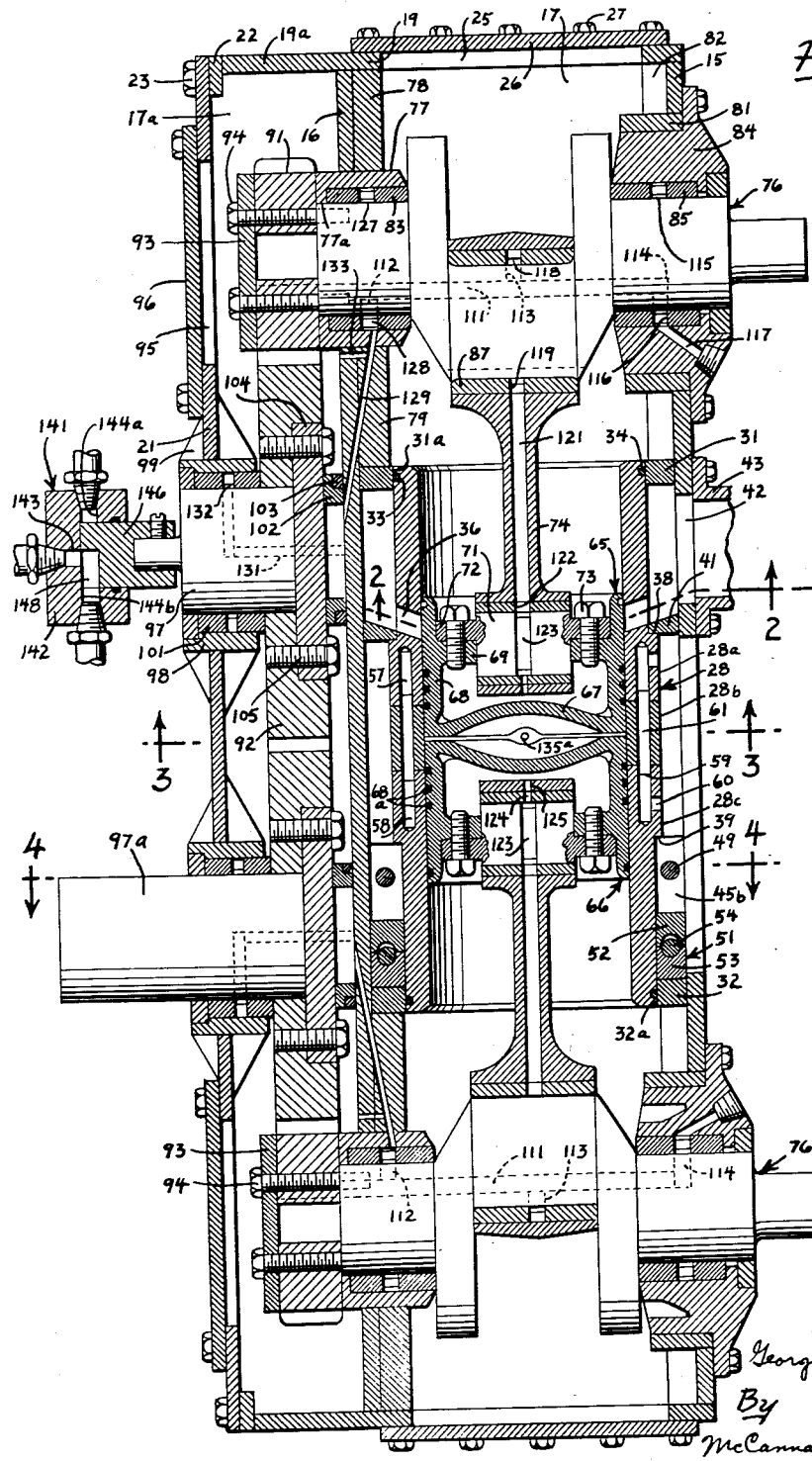
FIG. 1 is a sectional view through the engines taken on a plane parallel to the engine crank shaft.
Figure 2:
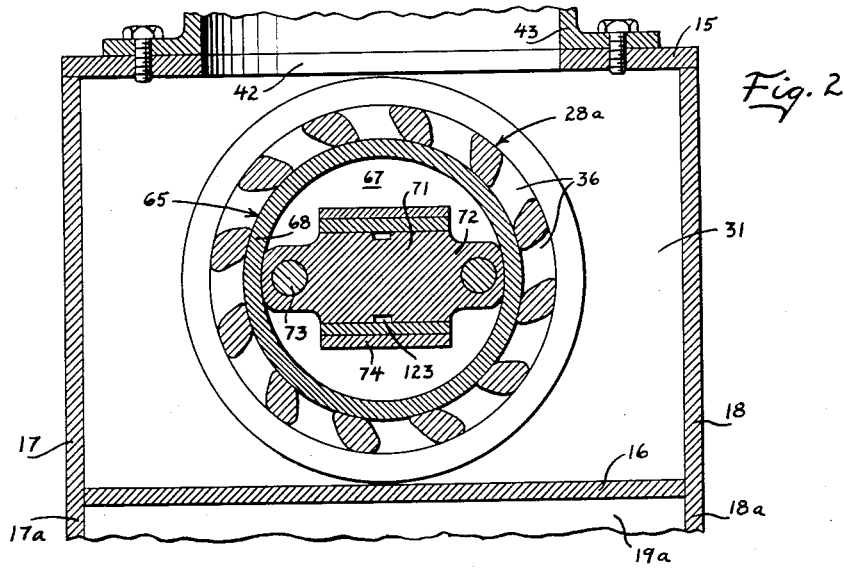
FIG. 2 is an enlarged fragmentary transverse sectional view taken on the plane 2—2 of FIG. 1.
Figure 3:
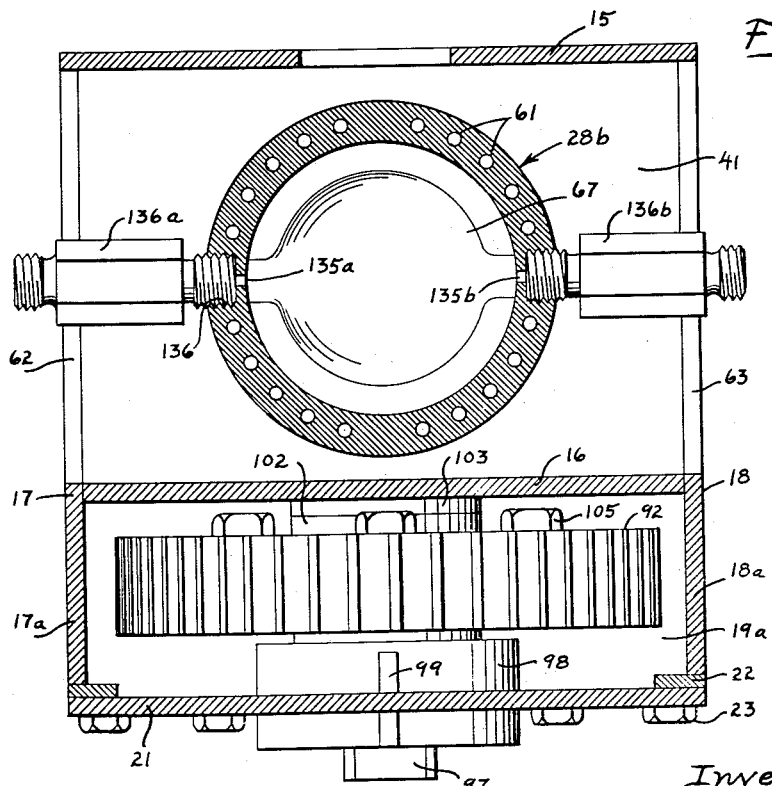
FIG. 3 is an enlarged fragmentary transverse sectional view, taken on the plane 3—3 of FIG. 1.

Reference is now made more specifically to FIGS. 1–5 of the drawings wherein there is illustrated a single cylinder opposed piston engine. In accordance with the present invention, the engine is formed with a minimum of cast parts to reduce the weight and minimize the machining operations required. In particular, the engine frame includes spaced end panels 15 and 16 formed of metal plate or the like, which end panels are secured to opposed side panels 17 and 18, as by welding. Crank case end plates 19 are affixed, as by welding, to the opposed ends of the side and end panels. Preferably, the side panels 17 and 18 and the crank case end plates 19 have extensions 17a—19a respectively thereon which project beyond the end panel 16 and define a gear case having a removable cover panel 21. As best shown in FIGS. 1 and 3, strips 22 are welded to the ends of the extensions 17a—19a and fasteners 23 extend through the cover panel 21 and into the strips to removably secure the former to the frame of the engine. A crank case inspection opening 25 is formed in the end plates 19 between the end panels 15 and 16 and a crank case cover plate 26 is removably secured over the opening by fasteners 27.

In accordance with the present invention, the engine is designed to have a relatively short stroke and preferably the stroke of each piston is much less than the diameter of the piston so as to enable the use of a relatively short cylinder, designated generally by the numeral 28. The cylinder 28 is formed separate from the frame of the engine and is constructed and arranged so as to enable free axial expansion and contraction of the cylinder and to also permit the cylinder to be moved laterally into and out of the frame, for repair or replacement, and thereby eliminate the necessity of disassembling the crank shafts of the engine, when repairing or replacing the cylinder or piston rings.

As shown in FIGS. 1 and 2, a pair of crank case seal plates 31 and 32 are rigidly secured, as by welding, to the end panels 15 and 16 and to the side panels 17 and 18 to extend thereacross and seal the engine crank cases. Enlarged openings 31a and 32a respectively are provided in the crank case seal plates 31 and 32 and slidably receive the opposed ends of the cylinder 28. The specific engine construction illustrated in the embodiment of FIGS. 1–5 does not employ a crank case induction system and it is accordingly desirable to seal the cylinder to the crank case, at both ends of the cylinder. This may conveniently be effected by forming a groove designated 33 in one of the mating surfaces of the cylinder and seal plates and by providing a suitable sealing ring 34 in the groove.

The cylinder 28, as is conventional, includes a plurality of inlet ports 36 spaced inwardly of one end thereof and exhaust ports 37 (see FIGS. 4 and 5) spaced inwardly of the other end thereof. The inlet ports are preferably arranged as shown in FIG. 2 so that the air entering through the inlet ports spirals within the cylinder and thus improves the scavenging. In accordance with the present invention, provision is made for clamping the intermediate portion of the cylinder 28 between the air inlet manifold and the exhaust manifold in such a manner as to prevent axial shifting of the cylinder while permitting longitudinal expansion and contraction of the end portions of the cylinder.

Figure 5:
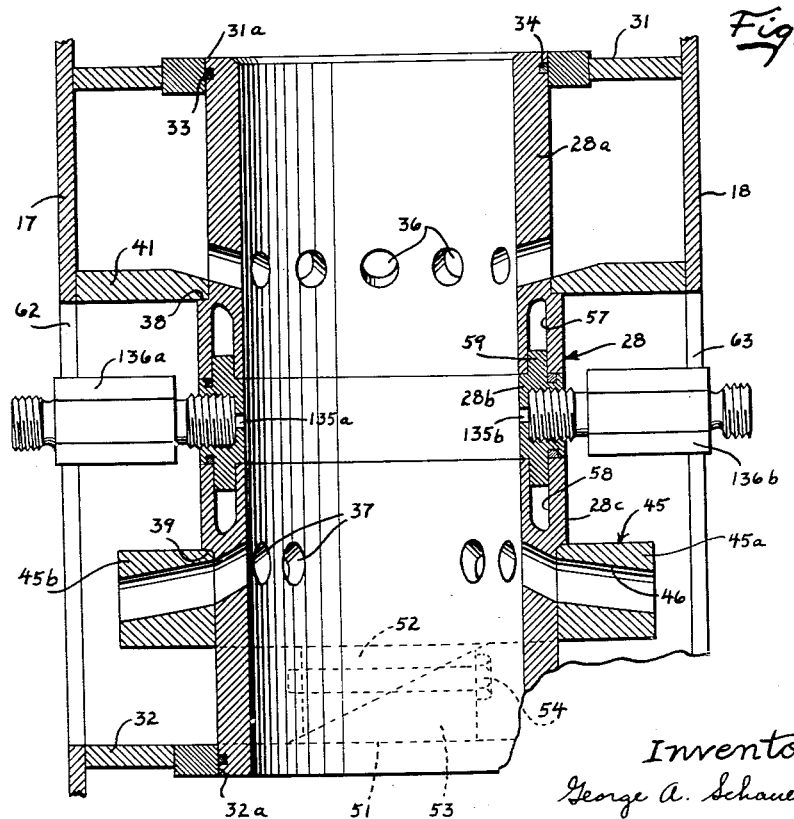
FIG. 5 is an enlarged fragmentary sectional view taken on a plane through the axis of the cylinder and in a direction perpendicular to the plane of FIG. 1.

As shown in FIGS. 1 and 5, the cylinder 28 has an enlarged intermediate portion defining oppositely facing outwardly extending shoulders 38 and 39 located intermediate the ends of the cylinder. In the specific embodiment illustrated, the air inlet manifold is formed by providing a deck seal plate 41 which engages one of the shoulders 38 and is attached to the engine frame in spaced relation to the adjacent crank case seal plate 31 to define an air intake chamber or manifold therebetween which communicates with all of the air intake ports 36. As is best shown in FIG. 2, the deck seal plate 41 extends between the end panels 15 and 16 and the opposed side panels 17 and 18 to form a seal thereacross and around the cylinder 28. An air intake opening 42 is formed in one of the end panels 15 and is connected through a flanged conduit 43 to a source of compressed air.

Figure 4:
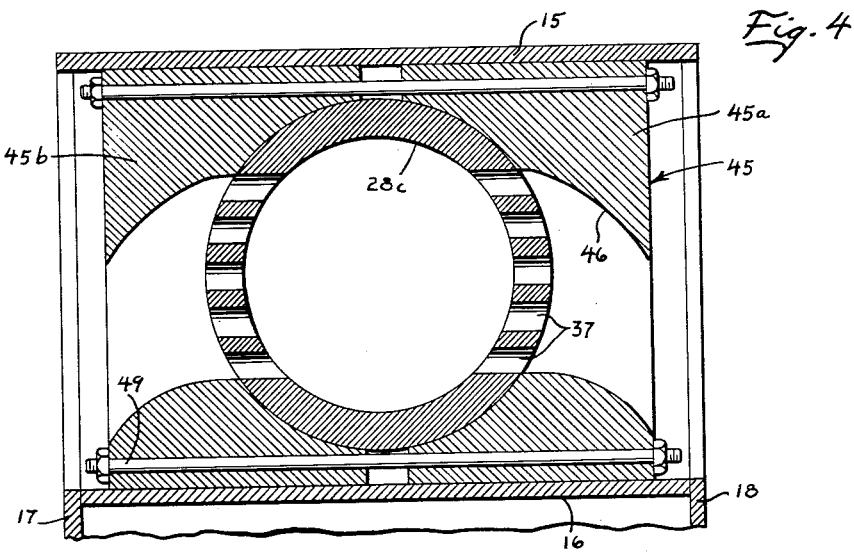
FIG. 4 is an enlarged fragmentary transverse sectional view, taken on the plane 4—4 of FIG. 1.

An exhaust manifold 45 surrounds the cylinder 28 and abuts against the other outwardly extending shoulder 39 thereon. As best shown in FIGS. 4 and 5, the exhaust manifold has passages 46 therein, which passages communicate at one end with the exhaust ports 37 in the cylinder and open at the other end at a point closely adjacent the opposed side panels 17 and 18. In the specific form shown, the exhaust manifold is formed in two pieces 45a and 45b which are clamped to the cylinder 28, as by bolts 49.

As previously mentioned, the intermediate portion of the cylinder is clamped to the frame to prevent axial shifting movement of the cylinder and in such a manner as to permit free axial expansion and contraction of the end portions of the cylinder, during heating and cooling of the engine. For this purpose, a clamp block 51 is interposed between the crank case seal plate 32 and the exhaust manifold 45 and arranged to force the exhaust manifold, and consequently the cylinder 28, in a direction toward the deck seal plate 41 to clamp the cylinder therebetween. The clamp block 51, as best shown in FIG. 12, may conveniently be formed of two triangularly shaped blocks 52 and 53 having the diagonal faces 52a and 53a respectively disposed and sliding contact. The blocks 52 and 53 have relatively parallel side faces 52b and 53b respectively and a stud 54 extends through an elongated slot 55 in one of the blocks and is threaded into a tapped bore 56 and the other of the blocks to increase or decrease the spacing between the side faces 52b and 53b, as the stud is respectively tightened and loosened. A plurality of these clamp blocks are provided between the seal plate 32 and the exhaust manifold 45 and, as shown in FIG. 1, are located between the outer periphery of the cylinder 28 and the adjacent end panels 15 and 16. As is apparent, when the studs 54 are tightened, the exhaust manifold 45 is pressed against the shoulder 39 on the cylinder 28 which urges the latter upwardly and firmly presses the other shoulder 38 against the seal deck 41 to thereby clamp the cylinder 28 therebetween. Since the end portions of the cylinders are slidably supported in the crank case seal plates 31 and 32, it is apparent that the end portions of the cylinder are free to axially expand and contract.

In the embodiment of FIGS. 1–5, the cylinder 28 is formed in a plurality of separate sections to facilitate machining of the parts and to enable use of different materials in different portions of the cylinder to provide the desired wear and corrosion resistant characteristics. In particular, the cylinder 28 includes an intake end portion 28a, a combustion ring 28b and an exhaust end portion 28c. The cylinder is arranged to be water cooled and for this purpose, annular grooves 57 and 58 are formed in the opposing ends of the end portions 28a and 28c of the cylinder. The combustion ring 28b is interposed between the end portions 28a and 28c and is formed with an annular axially extending flange 59 on each end thereof adapted to extend into the grooves 57 and 58 to center and locate the combustion ring with respect to the end portions of the cylinder. A plurality of annularly spaced holes or passages 61 are formed in the combustion ring to communicate the grooves 57 and 58 in the end portions and permit circulation of coolant therebetween. With this arrangement, the combustion ring is formed separate from the end portions of the cylinder and can be formed of a high quality corrosion resistant material while the end portions of the cylinder can be formed of a material having the desired wear characteristics. Further, this construction permits machining of the coolant passages in the cylinder and enables more economical and more accurate formation of the water jacket. Since the water jacket can be accurately machined, it is possible to use relatively thinner wall sections with the improved heat transfer which is effected thereby. Coolant is admitted and withdrawn from the water jacket through openings 60 formed in the outer wall of the end portions 28a and 28b of the cylinder.

It is an important feature of the present invention that the cylinder 28 can be inserted and removed from the side of the frame and in such a manner as to avoid the necessity of disassembling the crank shafts. The aforementioned cylinder construction and mounting on the engine frame is adapted for this purpose. More particularly, as best shown in FIGS. 4 and 5, openings 62 and 63 are formed in the side panels 17 and 18 of the engine and dimensioned to permit at least the largest section of the cylinder to be moved outwardly therethrough. These openings 62 and 63 extend between the air deck 41 and the crank case seal plate 32 and, as is shown in FIGS. 3 and 4, are somewhat wider than the major diameter of the cylinder 28. In order to disassemble the cylinder, the clamping blocks 51 are first removed to allow the exhaust end portion 28c of the cylinder to be moved downwardly through the opening 32a. This permits the combustion ring 28b to be removed through one of the openings 62 or 63. Thereafter the exhaust end portion 28c can be raised and withdrawn through the openings 62 or 63. The inlet end portion 28a can then be moved axially downwardly into the space between the air deck 41 and the crank case seal plate 42 to permit lateral withdrawal of the inlet end portion. Obviously, in assembling the cylinder on the engine frame, the aforementioned sequence is merely reversed.

A pair of opposed pistons 65 and 66 are slidably received within the cylinder 28. In order to facilitate removal of the cylinder through the side of the engine frame without necessitating removal of the crank shaft, an improved wrist pin construction is provided to enable disconnection of the connecting rod from the piston without necessitating removal of the piston from the cylinder. In particular, the pistons 65 and 66 are formed with a head 67 and skirt portion 68 having grooves for receiving the conventional piston rings 68a. Inwardly extending flanges 69 are formed on the skirt portions of the pistons and a wrist pin 71 is formed with laterally extending ears 72 which underlie the flanges 69 and are adapted to be secured thereto by cap screws 73 which extend upwardly through the ears 72 and are threaded into the flanges 69. As is apparent, the wrist pin 71 can be disconnected from the piston by merely loosening the cap screws 73, as by a suitable wrench extended upwardly through the crank case inspection plates 26. The connecting rod 74, which is operatively connected by the wrist pin 71 to the pistons, can thus be disconnected from the piston without necessitating removal of the piston from the cylinder. Consequently, the cylinder and pistons can be removed through the side openings 62 and 63 in the engine frame, after disconnection of the connecting rod.

A crank shaft 76 is rotatably mounted in each of the crank cases and operatively connected to a respective one of the connecting rods 74. As best shown in FIG. 1, a main bearing support ring 77 having an inwardly extending flange 77a is welded to the end plate 16 and reinforcing strips or gussets 78 and 79 are welded to the end plate 16 and to the main bearing support ring to firmly support the latter. A second main bearing support ring 81 is welded to the end plate 15 and suitable reinforcing gusset strips 82 are welded to the end plate 15 and to the support ring 81. A main bearing 83 is supported in the ring 77 and a main bearing retainer 84, carrying a main bearing 85, is disposed within the ring 81. The crank shaft 76 is rotatably supported in the main bearing and has an eccentric portion 86. A split bearing 87 is disposed around the eccentric 86 and the end of the connecting rod 74 is split to receive this bearing assembly.

As previously described, the engine is designed to have a relatively short stroke thereby enabling the crank shafts 76 to be positioned relatively close together. This, in turn, enables the crank shafts to be directly connected to each other through a gear train including a pinion gear 91 on each of the crank shafts 76 and one or more intermediate gears 92 which mesh with the pinion gears and drivingly interconnect the same. The pinion gears 91 are disposed on the crank shaft 76 between the end panel 16 and the gear case cover panel 21 and are non-rotatably secured to the shaft by means of a plate 93 and fasteners 94. An opening 95 is provided in the gear case cover panel to permit access to the fasteners 94 for removal of the pinion gears and a suitable cover plate 96 is attached to the cover panel to close the same. The intermediate gears 92 are also disposed between the end panel 16 and the gear case cover panel and are carried by a stub shaft 97. A bearing support ring 98 is welded to the cover panel 21 and reinforced by suitable gussets 99 to support the bearing 101 for the stub shaft 97. The other end of the stub shaft is supported by a combined radial and thrust bearing 102 supported by a ring 103 on the end panel 16. A flange 104 is provided on the stub shaft 97 and fasteners 105 extend through the flange and into the gear 92 to drivingly interconnect the latter.

As is apparent, the speed of rotation of the intermediate gear or gears 92 relative to the crankshafts, can be varied by merely changing the gear ratio between the crank-shaft gears and the intermediate gear. In accordance with the present invention, one of the shafts 97 connected to the intermediate gears 92, herein designated 97a, is utilized as the drive shaft and the gear ratio between the pinion gears 91 and intermediate gears 92 selected so as to drive the shaft 97a at the desired speed, thereby obviating the necessity of using separate gearing to provide the desired shaft speed.

The use of a short stroke engine design also simplifies the engine lubrication arrangement. As shown in FIG. 1, the stroke of the engine is made sufficiently short so that a portion of the eccentric overlaps the cross-section of the crank shaft 76 whereby an oil lubrication passage 111 can be drilled through one end portion of the crank shaft and through the eccentric portion 86 into the other end portion of the crank shaft. Lateral passages 112, 113 and 114 are drilled in the crank shaft and eccentric and intersect the longitudinal passage 111. The lateral passage 114 communicates with an oil groove 115 formed in the bearing 85 and through radial passages 116 in the bearing with an oil supply passage 117 formed in the bearing retainer 84. The passage 117 is threaded at the outer end thereof for the reception of a suitable fitting by means of which the same is connected to a source of lubricant under pressure. The lateral passage 113 communicates with an annular groove 118 formed in the connecting rod bearing 87 to lubricate the latter. A passage 119 is formed in the bearing 87 in communication with the groove 118 to supply lubricant through passages 121 and 122 in the connecting rod and connecting rod bearing respectively to the oil distribution groove 123 in the wrist pin 71. Aligned passages 124 and 125 are formed in the wrist pin bearing and in the connecting rod respectively to direct a stream of lubricant at the under side of the dome 67 of the piston 65, to cool the latter.

The lateral passage 112 in the crank shaft 76 communicates with an annular groove 127 formed in the main bearing 83, to distribute lubricant to the main bearing. A lateral passage 128 is formed in the main bearing and communicates with a passage 129 which is drilled through the gusset 79 and end panel 16 and opens at a point within the combined radial and thrust bearing 102. This applies lubricant to this bearing and some of the lubricant is conveyed by a passage 131 in the stub shaft 97 to an oil distribution groove 132 in the stub shaft bearing 101. A small lateral passage 133 is also drilled in the end panel 16 and gusset 79 to direct a spray of lubricant at the mesh point of the gears 91 and 92, to lubricate the same.

The specific engine construction illustrated in the embodiment of FIGS. 1–5 is arranged for operation as a compression ignition engine, it being apparent that the engine could, with minor changes well known to those skilled in the art, be adapted for operation as a spark ignition engine. Scavenging air is supplied through conduit 43 and the intake manifold to the air inlet ports 36. The air passes through the ports 36, when the latter are uncovered by the piston, and swirls through the cylinder 28 toward the outlet ports 37. The air from the outlet ports passes through the exhaust manifold 45 to atmosphere. In the subsequent compression stroke of the engine, the exhaust ports 37 are first closed and thereafter the inlet ports 36 are closed so as to compress the charge of air in the cylinder. Fuel is injected into the cylinder at the proper time in the cycle and, preferably, a pair of fuel injection ports 135a and 135b are formed in the combustion ring 28b, at relatively opposite sides thereof. As best shown in FIG. 5, the combustion ring has enlarged passages 136 which communicate with the injection ports and are threaded to receive conventional fuel injectors 136a and 136b. Preferably, fuel is injected through ports 135a and 135b alternately, so that hydraulic difficulties normally experienced in high speed fuel injection systems can be minimized. The fuel may be alternately supplied to the injectors 136a and 136b in each of the cylinders in any desired manner. As shown in FIG. 1, a fuel distribution system including a rotary valve 141 is provided. The rotary valve includes a stationary body 142 having a passage 143 adapted for connection to a fuel pump, and passages 144a and 144b respectively arranged for connection to the fuel injectors 136a and 136b. A rotary member 146 is disposed in the stationary body and has a passage 148 therein adapted to alternately communicate the fuel outlet passages 144a and 144b with the fuel inlet passage 143. With the specific valving arrangement illustrated, the rotary member 146 must rotate at one-half the speed of the crank shafts, in order to inject fuel into the cylinder only once during each cycle. Conveniently, the gear ratio between the pinion gear 91 and the intermediate gear 92 may be arranged to drive the shaft 97 at one-half the speed of the crankshaft so that the rotary valve member 146 may be directly connected to the intermediate shaft 97.

Figure 6:
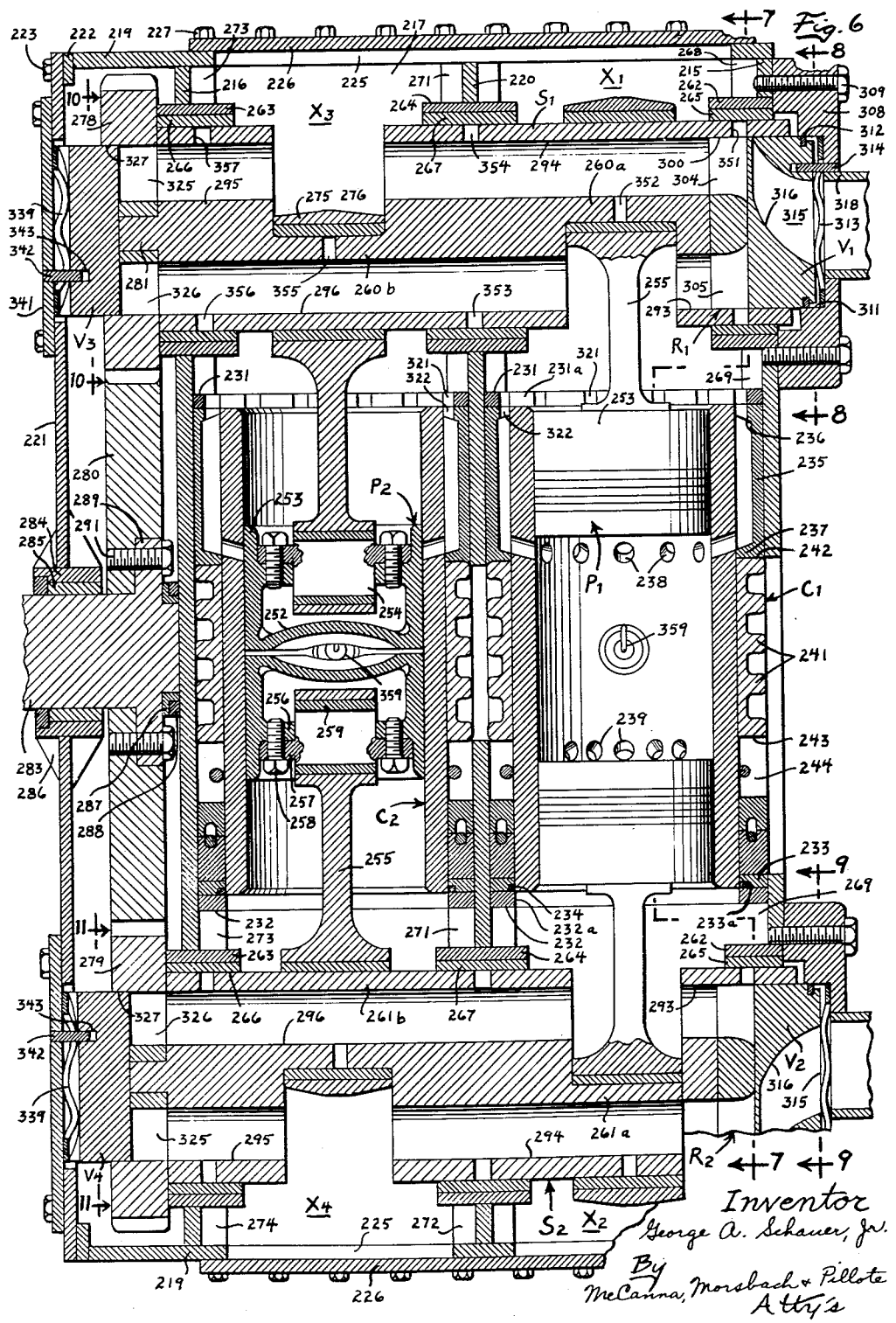
FIG. 6 is a sectional view through a modified form of engine, taken on a plane parallel to the axis of the crank shafts.

A modified form of engine employing two cylinders in side-by-side relation is illustrated in FIGS. 6–11. As in the previous embodiment, the engine includes a frame having spaced end panels 215 and 216 and crank case end plates 219. An intermediate panel 220 is located between the end panels 215 and 216 and is welded to the opposed side panels 217 and 218. As in the preceding embodiment, the side panels 217 and 218 and the end plate 219 are extended beyond the end panel 216 to form a gear case having a removable cover panel 221. Strips 222 are welded to the edges of the side panels and end panel and fasteners 223 extend through the gear case cover panel and into the strips to detachably secure the same thereto. Inspection openings 225 are formed in the crank case end panels and are covered by cover plates 226 which are fastened thereto by fasteners 227. A pair of cylinders $C_1$ and $C_2$ are mounted in side-by-side relation, as shown in FIG. 6, and extend between the crank cases. As in the preceding embodiment, the cylinders are mounted so as to permit free axial expansion and contraction of the end portions of the cylinder and also to permit sidewise removal of the cylinders from the frame.

Each of the cylinders and mountings therefor are similar, and like numerals are used to designate the same parts of the several cylinders. A pair of crank case seal plates 231 are welded to the side panels 217 and 218 and to the end and intermediate panels of the frame, in spaced relation to the crank case end plates 219, to define a crank case therebetween. A pair of similar crank case seal plates 232 are provided at the other end of the cylinders 228 and 229 and are welded to the side panels and to the end and intermediate panels in spaced relation to the adjacent crank case end plate 219 to also define a crank case therebetween. The seal plates 231 and 232 each have openings 231a and 232a therein respectively aligned with the ends of the cylinders $C_1$ and $C_2$.

In order to permit sidewise movement of the cylinders into and out of position in the frame, the crank case seal plates 231 and 232 are spaced apart a distance equal to or slightly greater than the length of the cylinder disposed therebetween. The end portions of each of the cylinders are slidably supported on respective ones of the seal plates 231 and 232 to permit free axial expansion and contraction of the same, and for this purpose there is provided a ring 233 which snugly surrounds one end of each cylinder and has a groove 233a therein for receiving a packing 234. As is apparent from FIG. 6, each of the rings 233 rest on a respective one of the crank case seal plates 232 and the packing is effective to seal the interface between the seal plate, the ring and the adjacent portion of the cylinder. The other end of each of the cylinders is slidably supported by an air intake manifold ring 235 which surrounds the cylinder in spaced relation thereto and has inwardly extending flanges 236 and 237 at opposite ends thereof. The flange 236 on each ring is arranged to abut against the respective crank case seal plate 231 and extends inwardly into engagement with the cylinder to slidably and guidably support the end portion of the same.

As is conventional in opposed piston engines, the cylinders have a plurality of air intake ports 238 spaced inwardly of one end thereof and a plurality of exhaust ports 239 spaced inwardly of the other end thereof. As is apparent from FIGS. 6 and 7, the air intake ports in each cylinder communicate with the chamber formed between the cylinder and the respective manifold ring 235 so that air supplied to the manifold ring passes through the air intake ports, when the latter are uncovered by the pistons.

As in the preceding embodiment, the cylinders $C_1$ and $C_2$ are releasably clamped to the frame, at a point intermediate the ends of the cylinders, to permit free axial expansion and contraction of the end portions of the cylinders. In the embodiment shown, a plurality of cooling fins 241 are provided on each of the cylinders and extend outwardly therefrom and define opposed shoulders 242 and 243 located intermediate the ends of the cylinders. Although an air cooled type cylinder is provided, it is apparent that a water jacket may be formed integrally with or pressed on the cylinder to provide a liquid cooled engine, if desired. The shoulder 242 on each of the cylinders abuts against the flange 237 on the manifold ring 235. An exhaust manifold 244 is disposed around the other end portions of the cylinders and abuts against the flange 243. The exhaust manifolds each have passages 245 therein (see FIG. 7) which communicate at one end with the exhaust ports 239 and open at the other end to atmosphere. Clamping blocks 246, of the type previously described, are interposed between each of the exhaust manifolds 244 and the respective seal ring 233. When the adjusting studs 247 on the clamping blocks are tightened, the exhaust manifolds are pressed upwardly against the shoulder 243 which, in turn, forces the cylinders upwardly until the shoulders 242 thereon firmly abut against the flanges 237 on the manifold rings 235. In this manner, the intermediate portion of each cylinder is firmly clamped between the intake manifold and the exhaust manifold therefor to prevent axial shifting of the cylinder while permitting free axial expansion and contraction of the end portions of the cylinder.

In order to permit sidewise installation of the cylinders into the frame, enlarged openings 249 (see FIG. 7) are provided in the side panels 217 and 218 and have a length and width at least equal to the length and width of the cylinder. Consequently, when the clamp blocks 246 are loosened, the cylinders can be withdrawn laterally from between the crank case seal plates 231 and 232, for repair or replacement of the cylinder or pistons.

Opposed pairs of pistons designated $P_1$ and $P_2$ are provided in the cylinders $C_1$ and $C_2$ and, as the preceding embodiment, each includes a domed head 252 and a skirt portion 253. The wrist pins 254 are attached to the pistons in such a manner as to enable removal of the connecting rod 255 from the piston, without removing the piston from the cylinder. As previously described, the pistons have inwardly extending flanges 256 provided on the skirt portions and the wrist pin 254 has laterally extending ears 257 which underlie the flanges 256 and are secured thereto by fasteners 258 which extend through the ears and into the flanges. In this manner, the studs 258 are accessible through the crank case inspection opening 225 to permit disconnection of the wrist pin from the pistons, prior to removal of the pistons from the cylinder. As is best shown in FIG. 6, a wrist pin bearing 259 is provided on the connecting rod 255 to rotatably receive the wrist pin 254.

A pair of crank shafts $S_1$ and $S_2$ are rotatably supported in the crank cases and are operatively connected to the connecting rods 255. For this purpose, a plurality of bearing support rings 262—264 are welded to the end panels 215 and 216 and to the intermediate panel 220, respectively, and support bearings 265—267 thereon. Reinforcing gussets 268 and 269 are welded to the end panel 215 and to the support ring 262. Similarly reinforcing gussets 271 and 272 are welded to the intermediate panel 220 and to the support ring 264 and gussets 273 and 274 are welded to the end panel 216 and to the support ring 263. The crank shafts $S_1$ and $S_2$ are rotatably supported in the bearings 265—267 and have a first eccentric portion 260a and 261a respectively located between the main bearings 265 and 267 and a second eccentric portion 260b and 261b respectively located between the main bearings 266 and 267. The connecting rods 255 have split end portions 275 adapted to receive split connecting rod bearings 276 for rotatably supporting the connecting rods on the crank shaft eccentrics.

The crank shafts $S_1$ and $S_2$ are drivingly inter-connected by a gear train including gears 278 and 279 on the crank shafts $S_1$ and $S_2$ respectively and an intermediate gear 280. The pinion gears 278 and 279 are non-rotatably connected to one end of the crank shafts $S_1$ and $S_2$, as by a key 281 and fasteners 282 (see FIGS. 10 and 11). The intermediate gear 280 is supported on a stub shaft 283. As shown in FIG. 6, a bearing support ring 284 is welded to the gear case cover panel 221 and supports a bearing insert 285. Suitable gussets 286 are welded to the support ring and to the gear case cover plate. The stub shaft 283 is supported in the insert 285 and the end of the stub shaft is supported in a combined radial and thrust bearing 287 which is mounted on the end panel 216 by a ring 288. The stub shaft has a flange 289 thereon which is secured to the intermediate gear 280 by fasteners 291.

In accordance with the present invention, the engine designed to have a relatively short stroke and the crank shafts $S_1$ and $S_2$ are made sufficiently large in diameter so that the eccentric portions thereon preferably lie wholly within the cross-section of the crank shaft. This provides a "webless" crank shaft which eliminates the necessity of providing split main bearings 265—267 and permits endwise insertion of the crank shaft. In addition, this crank shaft arrangement enables the use of an improved rotary valve crank case induction system for the opposed piston engine.

More particularly, the crank shafts $S_1$ and $S_2$ are each formed with a straight passage 293 which extends inwardly from one end of the crank shaft and communicates with a respective one of the crank case compartments $X_1$ and $X_2$ formed between the end panel 215 and the intermediate panel 220. A second straight passage 294 extends inwardly from the aforementioned end of each of the crank shafts and through the eccentric portions 260a and 261a and communicates with a respective one of the crank case compartments $X_3$ and $X_4$ located between the intermediate panel 220 and the end panel 216. A further straight passage 295, conveniently aligned with the passage 294, is formed in each of the crank shafts and extends inwardly from the other end thereof to communicate with a respective one of the crank case compartments $X_3$ and $X_4$. A fourth passage 296 is also formed in each of the crank shafts to extend inwardly from the second end thereof and communicates with a respective one of the crank case compartments $X_1$ and $X_2$. An improved rotary valve means, located at one end of each of the crank shafts $S_1$ and $S_2$, is provided for controlling fluid flow into the crank case compartments $X_1$, $X_2$, $X_3$ and $X_4$.

Figure 7:
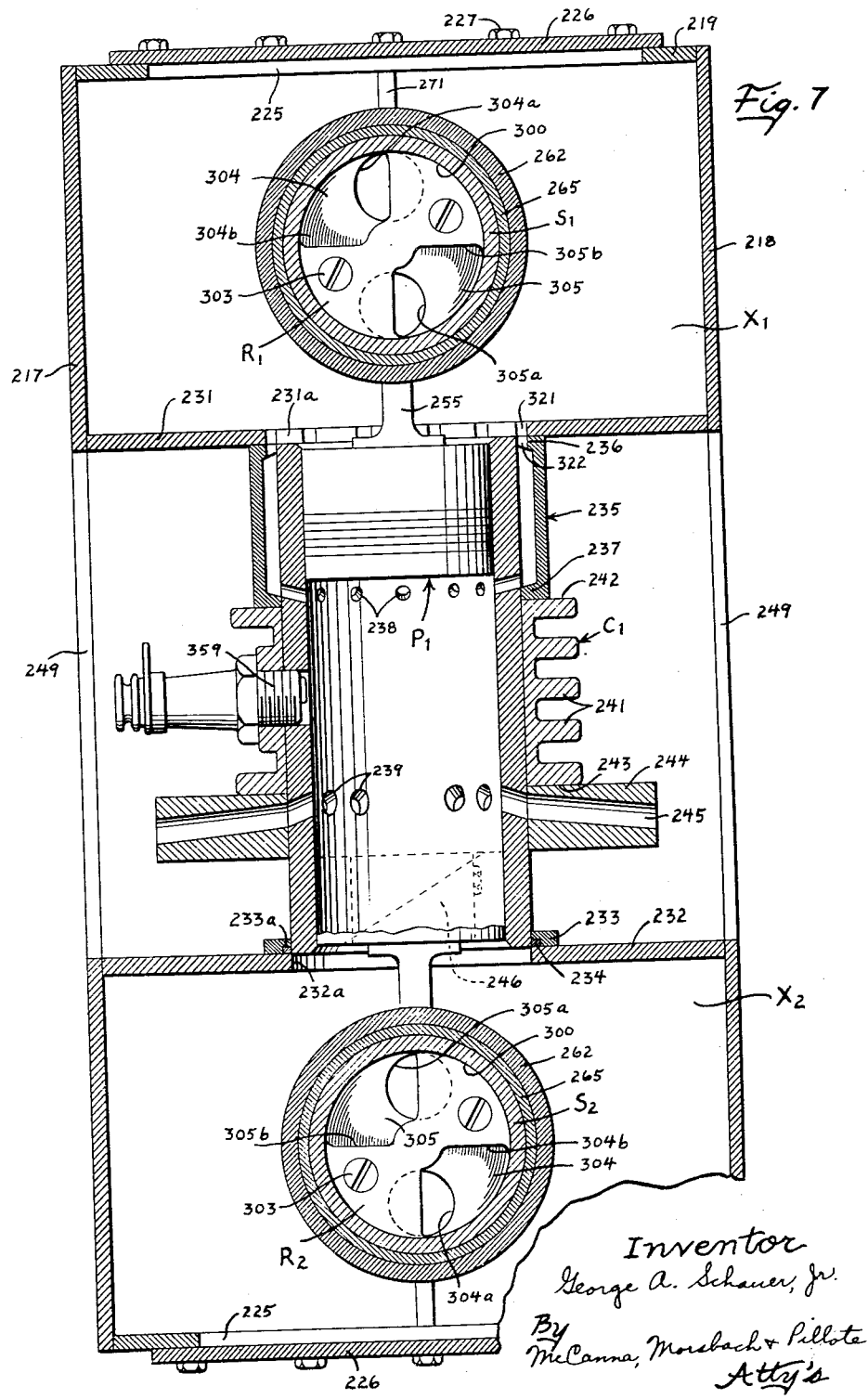
FIG. 7 is a sectional view taken on the plane 7—7 of FIG. 6.

More specifically, the end of each of the crank shafts $S_1$ and $S_2$ are recessed at 300 and rotary valve plates $R_1$ and $R_2$ are disposed in the recesses and rigidly secured to the respective crank shafts $S_1$ and $S_2$ by fasteners 303. As best shown in FIG. 7, each of the rotary valve members $R_1$ and $R_2$ have a pair of passages 304 and 305 therein which respectively communicate with the passages 294 and 293 in the crank shafts. The passages 304 and 305 each have a circular opening 304a and 305a respectively, at one end thereof, disposed in registry with the passages 294 and 293 in the crank shaft. As viewed in FIG. 7, the passages 304 and 305 spiral, in the direction of rotation of the crank shaft, from the round end thereof to enlarged arcuate openings 304b and 305b, which enlarged openings extend through substantially 90 degrees. Cooperating stationary valve members $V_1$ and $V_2$ also extend into the recess 300 and abut against the rotary valve plates $R_1$ and $R_2$ respectively. A cover plate 308 is attached to the end panel 215 and slidably supports the stationary valve members $V_1$ and $V_2$ on a shoulder 311 therein. A seal ring 312 is interposed between the stationary valve member and the cover plate and a spring, herein shown in the form of a wave washer 313, is interposed between the cover plate and the stationary valve member to yieldably urge the same against the rotary valve member. A pin 314 is attached to the cover plate and slidably extends into the stationary valve member, to constrain the latter against rotation while permitting axial sliding movement thereof. The stationary valve members $V_1$ and $V_2$ have a central opening 315 in one end thereof and a passage 316 which extends from the central opening at said one end to an eccentrically located opening 317 at the other end thereof. The opening 317 in each of the stationary valve members $V_1$ and $V_2$ is arcuate and extends through approximately 90 degrees and is adapted to register with the ports 304b and 305b in the respective rotary valve members $R_1$ and $R_2$ as the latter rotates. A conduit 318 is attached to each of the cover plates 308 and is adapted for connection to a carburetor.

In the embodiment illustrated, the crank shafts $S_1$ and $S_2$ are arranged to rotate in a counterclockwise direction, as viewed in FIGS. 8 and 9. The crank shafts $S_1$ and $S_2$ are in their dead-center positions and, as the crank shafts are rotated the pistons $P_1$ connected to the eccentric portions 260a and 261a will begin their compression stroke while the pistons $P_2$ connected to the eccentric portions 260b and 261b will begin their expansion stroke. When the crank shafts are in the dead-center position shown in FIGS. 7–9, the port 317 in each of the stationary valve members $V_1$ and $V_2$ is out of communication with the port 304b, and are just beginning to communicate with the port 305b in the rotary member. As the crank shafts are rotated from the positions shown in FIGS. 8 and 9, the ports 305b therein move into registry with the ports 317 in the respective stationary members so as to permit the air-gas mixture to flow in through the passages 293 into the crank case compartments $X_1$ and $X_2$ as the pistons $P_1$ move in their compression stroke. This draws the combustible mixture into the compartments $X_1$ and $X_2$. At this time, the ports 304b are closed so that combustible mixture from the conduit 318 does not pass into the passages 294 in the crank shafts. Passages 321 and 322 are formed in the seal plate 231 and in the flange 236 on the manifold ring 235 so as to permit the combustible mixture in the crankcase compartments $X_1$ and $X_3$ to pass upwardly into the air manifolds around cylinders $C_1$ and $C_2$ respectively as the pistons move in their expansion stroke. Thus, the charge of combustible mixture in the crank case $X_3$ will be forced upwardly through the passages 321 and 322 into the manifold ring 235 and through the ports 238, when the latter are uncovered by the pistons $P_2$ in their expansion stroke. When the crank shafts $S_1$ and $S_2$ reach their opposite dead-center position, the port 317 in the stationary valve members $V_1$ and $V_2$ are out of registry with the ports 305b in the rotary valve members, and begin to communicate with the ports 304b so as to permit the passage of combustible mixture through the passages 294 in the crank shafts $S_1$ and $S_2$ and into the crank case compartments $X_3$ and $X_4$.

The aforedescribed rotary valve arrangement is provided on each of the crank shafts 261 and, in accordance with the present invention, provision is made for communicating the crank case compartments $X_1$ and $X_2$ and crank case compartments $X_3$ and $X_4$ during the expansion stroke of the respective pistons $P_1$ and $P_2$. More specifically, the gears 278 and 279, as best shown in FIG. 6, have openings 325 and 326 therein which respectively communicate with the passages 295 and 296 in the crank shaft. The gears also have a recess 327 in the face thereof opposite the end of the crank shaft 261, and stationary valve members $V_3$ and $V_4$ are rotatably received in the recesses. A spring 339 is interposed between a gear case cover plate 341 and the respective stationary valve member, to yieldably urge the same against the bottom of the recess in the gear 278 and 279. A pin 342 is mounted on the cover plate 341 and is slidably received in a recess 343 in the stationary valve member, to constrain the latter against rotation.

The stationary valve members $V_3$ and $V_4$ have a port 345 therein adapted to register with the openings 325 and 326 in the gears, as the latter are rotated. The ports 345 conveniently open at one side of the rotary valve member, externally of the gear and are dimensioned and arranged so as to communicate with one of the openings in the gear, as the crank shaft is rotated from one dead-center position to another dead-center position, and to communicate with the other of the openings in the gear, as the crank shaft is rotated back to its actual position. In particular, the ports 345 in the stationary valve members $V_4$ and $V_3$ are arranged to register with the passages 325 in the gears 279 and 278 respectively, during the expansion stroke of the pistons $P_2$ to communicate the crank case compartment $X_4$ with the gear case and to communicate the gear case with the crank case compartment $X_3$. In this manner, the combustible mixture in the crank case compartment $X_4$, which is displaced during the expansion stroke of the pistons $P_2$, is passed through the gear case to the compartment $X_3$ to flow therefrom into the intake manifold around cylinder $C_2$.

The stationary valves $V_3$ and $V_4$ close the ports 324 in the gears 279 and 278, during the expansion stroke of the pistons $P_2$ to permit a charge of combustible fluid to be drawn into compartments $X_1$ and $X_2$ during the compression stroke of pistons $P_1$. During the compression stroke of pistons $P_2$ (the expanstion stroke of pistons $P_1$) the rotary valve is operative to block communication of crank case compartments $X_3$ and $X_4$ with the gear case and to instead communicate crank case compartments $X_2$ and $X_1$ with the gear case to feed combustible fluid from crank case compartment $X_2$ to crank case compartment $X_1$.

In order to improve the lubrication of the main and crank case bearings, lateral passages 351–357, inclusive, are formed in the crank shafts $S_1$ and $S_2$ and communicate with the longitudinally extending passages therein to convey the lubricant containing combustible mixture to the bearing surfaces.

Since the embodiment of FIGS. 6-11 is arranged for operation as a two-cycle internal combustion engine, a spark plug 359 is provided in the cylinder to ignite the charge therein at the proper time during the compression stroke.

The aforedescribed engine constructions achieve their greatest utility in a short stroke design wherein the stroke is less and preferably much less than the diameter of the piston. The inherent advantages of opposed piston construction such as uni-flow scavenging (the air flows into the cylinder at the air port end and out the other exhaust port end); elimination of conventional cylinder heads; adjustable compression ratio through adjustment of the phase or timing relationship of the two crank shafts; and arrangement of ports completely around the cylinder for more complete and rapid scavenging, are all realized by the present engine design. When the aforedescribed short stroke opposed piston design is used, the piston movement per stroke is decreased, thereby reducing friction and wear while increasing mechanical efficiency. The length of the scavenging air path is decreased and the rate of port opening is increased, thereby reducing the scavenging air horsepower requirements and also permitting higher rotative speeds. The permissible increase in engine speeds, in turn, increases the horsepower-to-weight ratio of the engine.

The short stroke opposed piston engine construction also enables the use of smaller and relatively light weight parts thereby reducing overall weight of the engine per horsepower developed and permitting the use of high quality materials. In such a short stroke opposed piston design, the cylinders are relatively short, thereby enabling the use of the aforedescribed cylinder mounting in which the cylinder can be installed through the side of the engine frame. As previously described, this arrangement not only facilitates repair and replacement of the cylinder and pistons, but also enables the use of high quality materials in the fabrication of the same.

The short stroke design also facilitates lubrication of the engine. The pistons wipe less area per stroke with a short stroke design and the area to be lubricated is relatively closer to the lubricating supply. Moreover, the short stroke engine enables the crank shaft eccentrics to overlap the main journal areas and even be confined within the main journal areas. This enables drilling of a straight passage through the crank shafts with lateral passages to the bearing areas to convey lubricant thereto. Consequently, oil passages and holes can be eliminated from the main bearings. In addition, crank shaft constructions wherein the eccentrics are confined within the main journal areas, permits endwise installation and removal of the crank shafts and eliminates the necessity of splitting the main bearings. As illustrated in FIGS. 6-11, the webless crank shaft enables the use of the novel rotary crank shaft valving arrangement in which the combustible mixture flows through passages in the crank shafts to the several intake manifolds.

While a single cylinder and a two cylinder in-line engine have been illustrated, it is apparent that the present engine construction is adaptable for use in a wide variety of multi-cylinder configurations.

I claim:

1. An opposed piston engine comprising a frame structure, a pair of crank shafts rotatably supported on said frame structure in spaced parallel relation, a cylinder formed separate from said frame structure and disposed between said crank shafts, means engageable with said cylinder intermediate the ends of the latter for clamping the intermediate portion of the cylinder against axial movement relative to the frame while permitting expansion and contraction of the end portions of the cylinder, means engageable with opposite ends of the cylinder for slidably supporting the ends of the cylinder on the frame structure, a pair of pistons in said cylinder, and connecting rods connecting said pistons to a respective one of said crank shafts.

2. An opposed piston engine comprising a frame structure, a pair of crank shafts rotatably mounted on said frame structure in spaced parallel relation, a cylinder formed separate from said frame structure and disposed between said crank shafts, means on the outer surface of said cylinder defining oppositely facing shoulders located intermediate the ends of said cylinder, means slidably supporting the ends of said cylinder on said frame structure, and means on said frame structure engageable with said shoulders on said cylinder for clamping said cylinder to said frame structure while permitting expansion and contraction of end portions of the cylinder, a pair of pistons in said cylinder, and connecting rods operatively connecting said pistons to a respective one of said crank shafts.

3. An opposed piston engine comprising a frame structure, a pair of crank shafts rotatably mounted on said frame structure in spaced parallel relation, a multiple section cylinder having separate end sections, means on each of said end sections defining an outwardly extending shoulder intermediate the ends of said sections, means on said frame structure engageable with said shoulders on said end sections for clamping said sections together and to said frame structure, a pair of pistons in said cylinder, and connecting rods operatively connecting said pistons to a respective one of said crank shafts.

4. An opposed piston engine comprising a frame structure, a pair of crank shafts rotatably supported on said frame structure in spaced parallel relation, a cylinder formed separate from said frame structure and located between said crank shafts, means engageable with the ends of said cylinder for slidably supporting the same for endwise movement on said frame structure, means engaging said cylinder intermediate the ends thereof for releasably securing said cylinder against endwise sliding movement, said frame structure having an opening in the side thereof dimensioned to permit lateral movement of said cylinder into and out of said frame structure, a pair of pistons in said cylinder, and connecting rods operatively connecting said pistons to a respective one of said crank shafts.

5. An opposed piston engine comprising a frame structure, means on said frame structure defining a pair of crank cases, a pair of crank shafts, bearing means in each of said crank cases rotatably supporting a respective one of said crank shafts, a cylinder formed separate from said frame structure adapted to extend between said crank cases, means engageable with the ends of said cylinder for slidably supporting the same on said crank cases, means engageable with said cylinder intermediate the ends of the latter for clamping the intermediate portion of the cylinder to said frame structure to prevent axial sliding movement of the cylinder while permitting expansion and contraction of the end portions thereof, a pair of pistons in said cylinder, and connecting rods operatively connecting said pistons to a respective one of said crank shafts.

6. An opposed piston engine comprising a frame structure, means on said frame structure defining a pair of crank cases, a pair of crank shafts, bearing means in each of said crank cases for rotatably supporting one of said crank shafts, a cylinder formed separate from said crank cases and extending between said crank cases, said cylinder having inlet ports therein spaced inwardly of one end thereof and exhaust ports therein spaced inwardly of the other end thereof, means engaging said cylinder at a point inwardly of said inlet ports and defining an intake manifold, means defining an exhaust manifold communicating with said exhaust ports, means engaging said exhaust manifold for urging the latter toward said intake manifold to clamp the intermediate portion of said cylinder therebetween and lock said cylinder against axial movement relative to said frame structure, a pair of pistons in said cylinder, and connecting rods operatively connecting said pistons to a respective one of said crank shafts.

7. The combination of claim 6 wherein said frame structure has an opening in the side thereof dimensioned to permit said cylinder to permit lateral movement of said cylinder into and out of said frame structure.

8. An opposed piston engine comprising a frame structure, means on said frame structure defining a pair of crank cases, a pair of crank shafts, bearing means in each of said crank cases for rotatably supporting one of said crank shafts, a one-piece cylinder formed separate from said crank shafts and extending between said crank cases, said cylinder having opposed outwardly extending shoulders located intermediate the ends thereof, said frame structure having an opening in the side thereof at least equal to the length and width of said cylinder to permit said cylinder to be moved laterally into and out of said frame structure, said cylinder having inlet ports therein located between one of said shoulders and the adjacent end of said cylinder and exhaust ports therein located between the other of said shoulders and the other end of said cylinder, means engaging said one of said shoulders and defining an intake manifold communicating with said inlet ports, means engaging the other of said shoulders and defining an exhaust manifold communicating with said exhaust ports, clamp means engaging said exhaust manifold for urging the latter toward said intake manifold to releasably clamp the intermediate portion of said cylinder therebetween, a pair of pistons in said cylinder, and connecting rods operatively connecting said pistons to a respective one of said crank shafts.

9. An opposed piston engine comprising a frame structure, means on said frame structure defining a pair of crank cases, a pair of crank shafts, bearing means in each of said crank cases rotatably supporting one of said crank shafts, a multiple section cylinder having separate end sections, said end sections each having an outwardly extending shoulder thereon spaced inwardly of one end thereof, one of said end sections having inlet ports therein located between said shoulder and said one end thereof, the other of said end sections having exhaust ports therein intermediate said shoulder and said one end thereof, means engaging said shoulder on said one section and defining an intake manifold communicating with said inlet ports, means engaging said shoulder on said other end section and defining an exhaust manifold communicating with said exhaust ports, means engaging one of said manifolds for urging it toward the other manifold to releasably clamp the said end sections of said cylinder together and to said frame structure, a pair of pistons in said cylinder, and connecting rods operatively connecting said pistons to a respective one of said crank shafts.

10. The combination of claim 9 wherein said cylinder includes a combustion ring formed separate from said end sections and interposed therebetween, said clamp means being operative to clamp said end sections to said combustion ring.

11. The combination of claim 9 wherein said frame structure has an opening in the side thereof at least equal to the length and width of one of said end sections to permit said cylinder to be moved laterally into and out of said frame structure.

12. The combination of claim 10 wherein said frame structure has an opening in the side thereof at least equal to the length and width of one of said end sections to permit lateral movement of said cylinder into and out of said frame structure.

13. An opposed piston engine comprising a frame structure, means on the frame structure defining a pair of crank cases, a crank shaft rotatably mounted in each of said crank cases, a cylinder formed separate from said frame structure and extending between said crank cases, said frame structure having an opening in the side thereof to permit said cylinder to be moved laterally therethrough into and out of said frame structure, means engaging said cylinder adjacent the ends thereof for slidably supporting the same on said frame structure, means on said cylinder defining opposed outwardly extending shoulders intermediate the ends of said cylinder, means engageable with said shoulders on said cylinder for releasably clamping the cylinder to the frame structure to prevent endwise movement thereof, a pair of hollow pistons in said cylinder each having a pair of inwardly extending ears thereon, a piston pin disposed in each of said pistons and having lateral projection thereon underlying said ears, fasteners extending upwardly through said projections and into said ears for detachably securing said piston pins to said pistons and to permit disconnection of the piston pin from the piston without removing the latter from the cylinder, and a connecting rod operatively connecting each piston pin to a respective one of said crank shafts.

14. An opposed piston engine comprising a frame structure including a pair of crank cases and frame members extending between said crank cases and interconnecting the same, a pair of crank shafts, bearing means in each of said crank cases for rotatably supporting one of said crank shafts, a cylinder formed separate from said frame structure and extending between said crank cases, means engageable with the ends of the cylinder for supporting the same on the crank cases for axial movement relative thereto to accommodate expansion and contraction of the cylinder, means intermediate the ends of said cylinder defining an abutment extending outwardly therefrom, first and second means separate from said cylinder each engaging a respective one of said crank cases and said abutment for clamping the intermediate portion of the cylinder between said crank cases to prevent axial displacement of the cylinder while permitting expansion and contraction of the end portions of the cylinder, a pair of pistons in the cylinder, and connecting rods operatively connecting said pistons to a respective one of the crank shafts.

15. The combination of claim 14 wherein said first means includes an annular intake manifold separate from said cylinder and extending therearound.

References Cited in the file of this patent

UNITED STATES PATENTS

| | | |
|---|---|---|
| 762,577 | Cordonnier | June 14, 1904 |
| 871,539 | Van Auken | Nov. 19, 1907 |
| 1,455,787 | Herr | May 22, 1923 |
| 1,586,623 | Heidelberg et al. | June 1, 1926 |
| 1,680,017 | Fornaca | Aug. 7, 1928 |
| 1,737,915 | Carrillo | Dec. 3, 1929 |
| 1,854,190 | Herr | Apr. 19, 1932 |
| 2,054,232 | Schneider et al. | Sept. 15, 1936 |
| 2,137,220 | Aikman | Nov. 22, 1938 |
| 2,199,699 | Frelin | May 7, 1940 |
| 2,266,192 | Grieshaber | Dec. 16, 1941 |
| 2,332,092 | Lieberherr | Oct. 19, 1943 |
| 2,469,651 | Jacobson | May 10, 1949 |
| 2,607,328 | Jencick | Aug. 19, 1952 |
| 2,613,651 | Herreshoff | Oct. 14, 1952 |

FOREIGN PATENTS

| | | |
|---|---|---|
| 840,465 | France | Jan. 16, 1939 |
| 284,888 | Switzerland | Aug. 15, 1952 |